United States Patent
Whitcomb

(10) Patent No.: US 9,841,961 B1
(45) Date of Patent: Dec. 12, 2017

(54) METHOD AND SYSTEM FOR PROVIDING ELASTIC FEDERATION AS A SERVICE

(71) Applicant: Intuit Inc., Mountain View, CA (US)

(72) Inventor: Thomas Whitcomb, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 669 days.

(21) Appl. No.: 14/445,914

(22) Filed: Jul. 29, 2014

(51) Int. Cl.
*G06F 9/445* (2006.01)
*H04L 29/08* (2006.01)

(52) U.S. Cl.
CPC .............. *G06F 8/61* (2013.01); *H04L 67/10* (2013.01)

(58) Field of Classification Search
CPC ..... H04L 67/10; G06F 8/61; G06F 2209/501; G06F 2209/5021
See application file for complete search history.

(56) References Cited

U.S. PATENT DOCUMENTS

| | | | | |
|---|---|---|---|---|
| 8,117,104 B2* | 2/2012 | Kothari | ................ | G06Q 10/00 705/35 |
| 8,918,761 B1* | 12/2014 | Whitcomb | ................ | G06F 8/71 709/223 |
| 9,282,122 B2* | 3/2016 | Cabrera | ................ | H04L 63/20 |
| 2006/0184935 A1* | 8/2006 | Abels | ................ | G06F 9/5077 718/1 |
| 2007/0240160 A1* | 10/2007 | Paterson-Jones | ..... | G06F 9/5055 718/104 |
| 2010/0131624 A1* | 5/2010 | Ferris | ................ | G06F 9/5072 709/221 |
| 2013/0066943 A1* | 3/2013 | Canning | ................ | H04L 65/80 709/203 |
| 2013/0282906 A1* | 10/2013 | An | ................ | H04L 41/04 709/226 |
| 2013/0332982 A1* | 12/2013 | Rao | ................ | H04L 63/08 726/1 |
| 2014/0289391 A1* | 9/2014 | Balaji | ................ | H04L 43/04 709/224 |
| 2015/0319192 A1* | 11/2015 | Cabrera | ................ | H04L 63/20 726/1 |
| 2015/0381641 A1* | 12/2015 | Cabrera | ............. | H04L 63/1425 726/23 |
| 2015/0381651 A1* | 12/2015 | Lietz | ................ | H04L 63/1441 726/23 |
| 2016/0156671 A1* | 6/2016 | Cabrera | ................ | H04L 63/20 726/1 |

* cited by examiner

*Primary Examiner* — Marina Lee
(74) *Attorney, Agent, or Firm* — Hawley Troxell Ennis & Hawley LLP; Philip McKay

(57) ABSTRACT

A system and method manages communications between applications and multiple user computing systems, according to one embodiment. The method and system includes establishing one or more virtual assets in an asset computing environment and installing an application onto the one or more virtual assets in the asset computing environment, according to one embodiment. The system and method receives a first request from a first user computing system and a second request from a second user computing system and delivers the first request and the second request to the application, according to one embodiment. The system and method receives a first result from the application for the first request and a second result from the application for the second request and distributes the first result to the first user computing system and the second result to the second computing system, according to one embodiment.

28 Claims, 4 Drawing Sheets

METHOD AND SYSTEM FOR PROVIDING ELASTIC FEDERATION AS A SERVICE

BACKGROUND

To remain competitive in today's crowded software market, software companies are challenged with the task of making new software products available for consumer use as quickly as possible. To release new software products, software companies develop, integrate, and test each feature of a product, so more features can result in longer delays to market. Because developing and testing a software application that only supports a single user can be done easier and faster (as compared to a multi-user software application), one feature that may delay the release of a software application is multi-user support for the software application.

What is needed is a method and system for managing communications between an application and multiple user computing systems.

SUMMARY

In accordance with one embodiment, a system and method for managing communications between applications and multiple user computing systems includes establishing, with a tenant computing system, one or more virtual assets in an asset computing environment. Each of the one or more virtual assets may be allocated hardware and software assets from the asset computing environment, in one embodiment. The system and method installs an application onto the one or more virtual assets in the asset computing environment and receives a first request from a first user computing system and a second request from a second user computing system, according to one embodiment. The first request and the second request may be requests for services from the application. The system and method delivers, with the tenant computing system, the first request and the second request to the application, according to one embodiment. The first request may include first user data and the second request may include second user data. The system and method receives, with the tenant computing system, a first result from the application for the first request and a second result from the application for the second request, according to one embodiment. The first result may be associated with applying the application to the first user data and the second result may be associated with applying the application to the second user data. The system and method distributes, with the tenant computing system, the first result to the first user computing system and the second result to the second computing system, according to one embodiment.

In accordance with one embodiment, a system and method for distributing multi-user support to a computing system for an application includes maintaining, with a tenant computing system, one or more virtual assets in an asset computing environment. Each of the one or more virtual assets is allocated hardware and software resources from the asset computing environment. The system and method installs the one or more applications onto the one or more virtual assets in the asset computing environment, according to one embodiment. The system and method receives, with the tenant computing system, application service requests from multiple user computing systems to apply the one or more applications to user data associated with the user computing systems, according to one embodiment. The system and method queues the application service requests in an order, according to one embodiment. The order may be at least partially based on a priority of each of the user computing systems or may be at least partially based on sequence in which the application service requests were received by the tenant computing system. The system and method transmits, with the tenant computing system, the application service requests to the one or more applications, according to one embodiment. The system and method distributes, with the tenant computing system, responses to the application service requests to the one or more user computing systems from the one or more applications, according to one embodiment.

Figure 1:
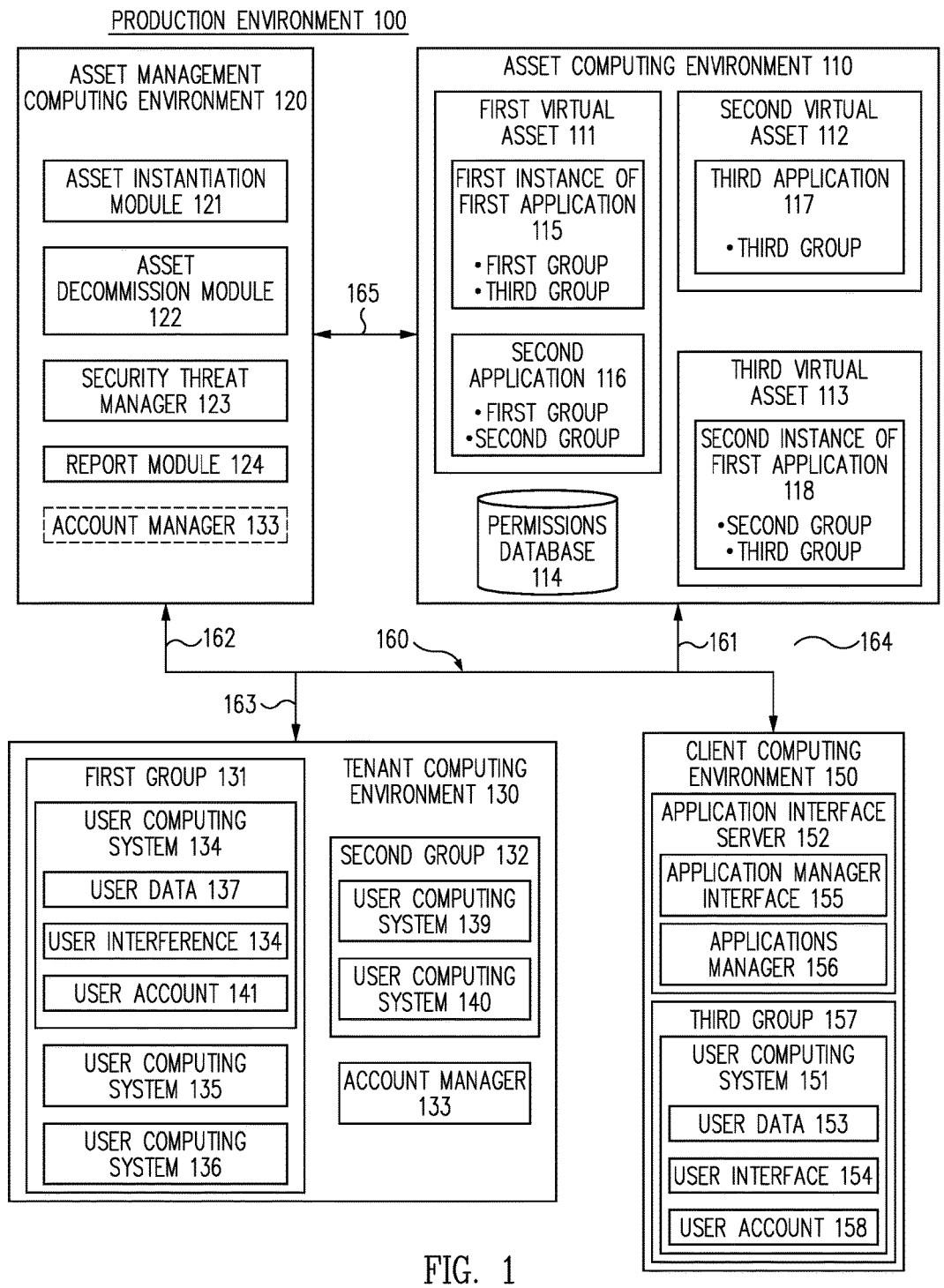
FIG. 1 is a block diagram of a hardware architecture for managing communications between applications and multiple user computing systems, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for managing communications between applications and multiple user computing systems, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for managing communications between applications and multiple user computing systems and/or for distributing multi-user support for software applications, according to one embodiment. The production environment 100 includes one or more computing environments that are configured to reduce the development and testing time associated with releasing new software applications, according to one embodiment. Software managers within software companies seek new and faster ways to release new software products, e.g., software applications. Once a software company has approved the development or release of a new software product or application, the software manager has several tasks to consider and address. Some of the tasks can include selecting a team; analyzing and determining the requirements for the application; designing the application; measuring and tracking development of the application; developing the application; integration of application features; and testing. One technical challenge or problem that may arise from developing, testing, and releasing new software applications is that although some software features are common to many software applications, each time the common features are included in a software application, the features are developed, integrated with other features, and tested for reliability and proper functionality. According to one embodiment, the production environment 100 is configured to distribute application features, e.g., multi-user support, to reduce delays in software application production and release.

In one embodiment, the production environment 100 manages communications between applications and multiple user computing systems by distributing multi-user support across one or more computing environments within the production environment 100. According to various embodiments, distributing multi-user support across one or more computing environments includes, but is not limited to, distributing account/profile management for one or more software applications by: hosting the applications, installing the applications, initializing and allocating computing resources for the applications, and maintaining/enforcing account policies for the applications. According to one embodiment, the production environment 100 includes an account manager that is hosted in a tenant computing environment. According to one embodiment, the account manager establishes virtual assets in an asset computing environment, directs the installation of applications onto the virtual assets, manages permission rights for access to the applications for one or more groups of computing systems, and transmits/receives service requests and service responses between user computing systems and the applications that are installed on and hosted by the virtual assets.

According to one embodiment, the production environment 100 includes several computing environments for managing communications between application and user computing systems. According to one embodiment, the production environment 100 includes an asset computing environment 110, an asset management computing environment 120, a tenant computing environment 130, and a client computing environment 150. According to one embodiment, the asset computing environment 110 hosts virtual assets and applications to provide application services to the user computing systems of the tenant computing environment 130 and of the client computing environment 150. According to one embodiment, the tenant computing environment 130 manages communications, e.g., all communications, between the user computing systems and the application(s) hosted by the asset computing environment 110. By managing all communications between the user computing systems and the hosted application(s), the tenant computing environment 130 provides multi-user support, operations, or functionality to the application(s) that may not have been developed to support multi-user operations, according to one embodiment. The tenant computing environment 130 can also be configured to manage communications between the hosted application(s) and the client computing environment 150 or other clients, e.g., as a cost-based service, according to one embodiment. According to various embodiments, each of the computing environments of the production environment 100 can be generically referred to as a "first computing environment", a "second computing environment", a "third computing environment", and so forth.

The computing environments 110, 120, 130, and 150 are communicatively coupled together through a network 160, according to one embodiment. The network 160 can include one or more communication channels 161, 162, 163, and 164 to enable the computing environments to communicate information to one another, according to one embodiment. The network 160 can include, but not be limited to, a LAN, PAN, WAN, intranet, and the Internet, according to various embodiments.

The asset computing environment 110 is configured to host one or more virtual assets for providing computing services to one or more tenants and/or users, according to one embodiment. The asset computing environment 110 provides computing services to tenants and users with a first virtual asset 111, a second virtual asset 112, a third virtual asset 113, in accordance with a permissions database 114, according to one embodiment. While the asset computing environment 110 is depicted as including three virtual assets 111, 112, and 113 ("111-113"), it is to be understood that the asset computing environment 110 can include more or less virtual assets than are particularly described herein. The virtual assets 111-113 are each an allocation/assignment of one or more hardware, software, and/or firmware resources to one or more tenants or customers, according to one embodiment. The tenant may purchase, rent, lease, borrow, or otherwise receive authorization to install, operate, transfer, and/or host applications and/or data with each of the virtual assets 111-113, according to one embodiment. In one embodiment, the asset computing environment 110 is a cloud computing environment. In one embodiment, each of the virtual assets 111-113 represents an allocation of cloud-based or remotely accessible software, firmware, and/or hardware computing resources to one or more tenants for providing one or more services to one or more clients of the tenant, e.g., users. The first virtual asset 111 includes a first instance of a first application 115 and a second application 116. The second virtual asset 112 includes a third application 117, and the third virtual asset 113 includes a second instance of the first application 118, according to one embodiment. According to various embodiments, some or all of the applications 115, 116, 117, 118 ("115-118"), are applications that have been developed as single-user applications, and exclude or lack features for independently supporting multi-user operations. In other embodiments, one or more of the applications 115-118 are limited to single-user operations, while others of the one or more applications or instances of applications 115-118 support multi-user operations in addition to single-user operations. The applications 115-118 can provide one or more database services, computing services, or other services to the tenant or to the clients of the tenant, according to one embodiment.

The asset management computing environment 120 manages the virtual assets and other computing resources of the asset computing environment 110, according to one embodiment. The asset management computing environment 120 is communicatively coupled to the asset computing environment 110 through the network 160, according to one embodiment. In some implementations of the production environment 100, the asset management computing environment 120 can be operatively or communicatively coupled to the asset computing environment 110 through a communication channel 165. In one embodiment, the communication channel 165 is a backend communication channel that is inaccessible to the network 160. The asset management computing environment 120 includes an asset instantiation module 121, an asset decommission module 122, a security threat manager 123, and a report module 124, according to one embodiment.

The asset management computing environment 120 uses the asset instantiation module 121 to create, or instantiate, initialize, and/or otherwise establish virtual assets in the asset computing environment 110, according to one embodiment. The asset instantiation module 121 creates new instances of virtual assets, i.e., instantiates new virtual assets, in response to requests from a tenant for the new virtual assets. The asset instantiation module 121 determines which resources in the asset computing environment 110 are available and satisfy the tenant's request. The asset instantiation module 121 then allocates one or more available resources as a virtual asset to the tenant, and provides the tenant with access rights, handles, addresses, account information, and other information associated with the newly allocated/created virtual asset. The access rights, handles, addresses, and account information enable the tenant to independently manipulate, operate, and change the functionality and computing resources associated with the virtual asset, according to one embodiment. In one embodiment, the asset management computing environment 120 uses the asset instantiation module 121, or another aspect of the asset management computing environment 120, to dynamically reallocate the resources associated with the virtual asset, in response to a request from a tenant or in response to a tenant's use of the virtual asset. For example, a tenant may request that the asset management computing environment 120 increase/decrease memory resources, increase/decrease computer processor capacity, and/or modify other characteristics of a particular virtual asset, e.g., the first virtual asset 111.

The asset management computing environment 120 uses the asset decommission module 122 to delete, destroy, de-allocate, terminate, and/or decommission virtual assets in the asset computing environment 110 that are associated with a tenant's account, according to one embodiment. For example, if a tenant, e.g., the tenant computing environment, determines that one or more virtual assets are underutilized, no longer desired, or are inefficient, the tenant may request that the asset management computing environment 120 use the asset decommission module 122 to terminate or decommission those one or more virtual assets, according to one embodiment.

The asset management computing environment 120 uses the security threat manager 123 to monitor the asset computing environment 110 for potential security breaches and to resolve detected security breaches, according to one embodiment. The security threat manager 123 updates one or more tables, databases, and/or other data structures with information that may be used to identify potential security threats that are attacking or that have breached the virtual assets 111-113, or other resources of the asset computing environment 110, according to one embodiment. The security threat manager 123 monitors the virtual assets 111-113 for patterns, signatures, and/or other characteristics that may be indicative of potential security threats. Upon detection of a potential security threat, the security threat manager 123 can take one or more remedial actions to resolve the potential security threat. In one embodiment, the security threat manager 123 transmits a security patch or other threat removal code to the affected virtual asset. In another embodiment, the security threat manager 123 notifies a tenant, system administrator, or security personnel of the potential security breach to enable one or more human resources to resolve the potential security threat.

The asset management computing environment 120 uses the report module 124 to provide updates to the tenant regarding the tenant's one or more virtual assets hosted by the asset computing environment 110, according to one embodiment. The report module 124 can be configured to provide periodic automated reports that include information associated with virtual asset usage, expended resources, available resources, potential security threats, and/or recommendations for adjusting allocations of computing resources to the virtual assets 111-113, according to one embodiment. For example, the asset management computing environment 120 can determine that one or more user accounts associated with the particular virtual asset are underutilized or over utilized and can periodically, e.g., monthly or quarterly, transmit reports to the tenant computing environment 130 that describe user activity. Using these reports, the tenant, e.g., tenant computing environment 130, can adjust its billing structures, increase/decrease computing resources associated with a virtual asset, and/or add/remove user accounts, according to one embodiment.

While the functionality of the asset management computing environment 120 has been described herein in terms of various modules and managers, the asset management computing environment 120 can include more or less modules and/or managers than have been described herein, while continuing to provide the services and/or functionality that is associated with the asset instantiation module 121, the asset decommission module 122, the security threat manager 123, and/or the report module 124, according to various embodiments.

The tenant computing environment 130 represents a computing environment of a tenant of the asset computing environment 110, according to one embodiment. As described above, briefly, a tenant includes, but is not limited to, any entity/person that enters a relationship, agreement, and/or contract, with an asset service provider or other service provider to receive an allocation of one or more assets or asset resources within, for example, the asset computing environment 110. "Tenant" and the tenant computing environment 130 are used interchangeably herein. The tenant computing environment 130 can represent the computing resources of a business, academic institution, or other organization. The tenant computing environment 130 includes a first group 131 of user computing systems, a second group 132 of user computing systems, and an account manager 133 that enables the groups 131, 132 of user computing systems to selectively receive the services of the applications 115-118.

The tenant computing environment 130 manages communications between the applications 115-118 and tens, hundreds, or thousands of user computing systems, according to one embodiment. The tenant computing environment 130 selectively provides permission rights or access rights for the user computing systems to receive services from the virtual assets 111-113 and/or from the applications 115-118, in accordance with the policies set forth by the account manager 133, according to one embodiment. For example, the first group 131 can include a user computing system 134, a user computing system 135, and a user computing system 136, according to one embodiment. The user computing system 134 includes user data 137, a user interface 138, and a user account 141, according to one embodiment. The user interface 138 enables a user to transmit the user data 137 with the user account 141 to the applications 115-118, through the account manager 133. Although not explicitly illustrated, the other user computing systems of the tenant computing environment 130 also include user data, user interfaces and user accounts, similar to the user data 137, the user interface 138, and the user account 141, in accordance with various embodiments. The second group 132 includes a user computing system 139 and a user computing system 140. Although the first group 131 includes three user computing systems and the second group 132 includes two user computing systems, each of the groups 131, 132 can include more or less user computing systems, according to various embodiments.

The account manager 133 provides an interface between the user computing systems 134, 135, 136, 139, 140 ("134-136, 139-140") and the applications 115-118 to manage communications and to provide distributed multi-user support for the applications 115-118, according to one embodiment. The account manager 133 receives requests, e.g., application services requests, from the user computing systems for services from one or more of the applications 115-118. The account manager 133 queues the requests and selectively transmits the requests to the applications 115-118 for response. The account manager 133 receives responses from the applications 115-118 after the applications 115-118 have satisfied the transmitted request. In some embodiments, the applications 115-118 satisfy a request or application services request by performing one or more operations on user data that is associated with the request. In one embodiment, the user data includes financial data for the tenant and the applications 115-118 execute financial, organizational, and/or mathematical operations on the user data. The account manager 133 then distributes the responses from the applications 115-118 to the user computing systems 134-136, 139-140. By serving or functioning as an intermediary between the applications 115, 116, 117, 118 and the user computing systems 134-136, 139-140, the account manager 133 can provide distributed multi-user support for one or more of the applications hosted in the asset computing environment 110, according one embodiment. By providing distributed multi-user support for the user computing systems 134-136, 139-140, the account manager 133 enables the tenant computing environment 130 to use a single-user application to service a multi-user computing environment. An advantage of distributing application functionality, e.g., multi-user support, to the tenant computing environment 130 is that an application can be developed, tested, and hosted in less time and can therefore more quickly be used to service the needs and/or demands of a tenant, than if the additional feature or features were integrated into the applications. An additional advantage of distributing application functionality, e.g., multi-user support, to the tenant computing environment 130 is that the application can be hosted in a resource-elastic cloud computing environment, e.g., the asset computing environment 110, and the hosted application can be hosted with computing resources that can be dynamically expanded, increased, collapsed, or decreased, according to an quantity of use, quantity traffic, or quantity of user computing systems that the tenant assigns or allocates to the application.

The account manager 133 provides application or virtual asset access to the user computing systems in accordance with one or more account policies, according to one embodiment. The account manager 133 may have an accounts policy that determines which of the user computing systems 134-136, 139-140 can share virtual assets and/or applications. To illustrate with an example, the tenant computing environment 130 can represent a software company XYZ that has two business units. The first group 131 of user computing systems can represent a first business unit, such as accounts receivable, and the second group 132 of user computing systems can represent a second business unit, such as accounts payable. For various reasons, the software company XYZ may determine that the company operates more efficiently or smoother when the two business units use separate instances of a particular accounting software application ABC. The account manager 133 can split virtual resources so that the first group 131 and the second group 132 are allocated separate instances of the application ABC within the asset computing environment 110. For example, the first instance of the first application 115 and the second instance of the first application 118 can be two instances of the accounting software application ABC. In one implementation, the account manager 133 grants access to the first instance of the first application 115 to the first group 131 while denying access to the first instance of the first application 115 to the second group 132. Concurrently, the account manager 133 grants access to the second instance of the first application 118 to the second group 132 while denying access to the second instance of the first application 118 to the first group 131, according to one embodiment.

In addition to hosting separate instances of the accounting software application ABC, the account manager 133 can provide additional separation between the business units by installing the instances of the accounting software onto separate virtual assets, according to one embodiment. In one embodiment, the first instance of the first application 115 is installed on the first virtual asset 111, which is different than the third virtual asset 113 on which the second instance of the first application 118 is installed. In other words, the account manager 133 can install two different instances of the accounting software application ABC onto two different virtual assets to provide further separation of resources between the two business units. In some embodiments, the account manager 133 virtually separates the operations of the first group 131 and the second group 132 as a security measure, to limit the potential for mingling of user data from the first group 131 with user data from the second group 132.

Continuing with the example of the software company XYZ, the account manager 133 is also configured to receive application services requests from user computing systems that are external to the tenant computing environment 130, according to one embodiment. For example, the software company XYZ, e.g., the tenant computing environment 130, can have a client Jane Smith & Co, e.g., the client computing environment 150. In one embodiment, the software company XYZ, e.g., the tenant computing environment 130, hosts the applications 115-118 in the asset computing environment 110, and provides application services to the client Jane Smith & Co. through the account manager 133.

The account manager 133 can be hosted by various computing environments within the production environment 100, according to one embodiment. For example, the account manager 133 can be installed onto or executed by the asset management computing environment 120, according to one embodiment. In other embodiments, the account manager 133 in run from the asset computing environment 110 and/or the client computing environment 150.

To receive application services from the asset computing environment 110 through the tenant computing environment 130, the client computing environment 150 includes one or more user computing systems, e.g., a user computing system 151, and an application interface server 152, according to one embodiment.

The user computing system 151 is a computing system from which a user can request and receive application services, according one embodiment. The user computing system 151 includes user data 153, a user interface 154, and user account 158. In one embodiment, any communications between the user computing system 151 and any of the applications 115-118 is routed through the application interface server 152 and the account manager 133 prior to receipt by the asset computing environment 110.

The application interface server 152 provides an interface to the user computing system 151 and manages which applications the user computing system 151 is able to access. In one embodiment, the application interface server 152 includes an application manager interface 155 and an applications manager 156. The application manager interface 155 communicates with the account manager 133 to submit requests for application services, to create/destroy client user accounts, to request access to virtual assets and/or applications, and to receive responses from the applications 115-118. In one embodiment, the application manager interface 155 is a reduced feature version of the account manager 133 and enables the client computing environment 150 to group, issue/revoke permissions rights, and otherwise manage the user computing system 151 and other user computing systems in the client computing environment 150. In one embodiment, the application manager interface 155 is installed on one or more of the user computing systems 134-136, 139-140, 151 to enable the computing systems to selectively access the services of the applications 115-118, via the account manager 133.

The applications manager 156 determines which applications the user computing system 151 receives access to. The applications manager 156 communicates with the account manager 133, through the application manager interface 155 to determine which applications are available in the asset computing environment 110. To provide access to the user computing system 151 to an existing application in the asset computing environment 110, the applications manager 156 requests access to the application from the account manager 133 through the application manager interface 155. To provide access to the user computing system 151 to an application that does not presently exist in the asset computing environment 110, the applications manager 156 submits a request to the account manager 133 that the desired application be installed in one or more of the virtual assets 111-113, and the applications manager 156 requests access to the desired application upon installation. According to one embodiment, the account manager 133 creates virtual assets and installs applications specifically to satisfy requests from clients, e.g., the client computing environment 150. In one embodiment, the account manager 133 creates the second virtual asset 112 for use by the client computing environment 150 and installs the third application 117 on the second virtual asset 112, for exclusive use by a client user, e.g., the user computing system 151. According to one embodiment, the user computing system 151 and other user computing systems within the client computing environment 150 constitute a third group 157 of user computing systems, and the third application 117 is limited to providing services to the third group 157 of user computing systems.

While the user computing system 151 and the application interface server 152 are illustrated and described herein as two independent computing systems, according to one embodiment, the application interface server 152 is integrated into the user computing system 151, according to one embodiment.

Figure 2:
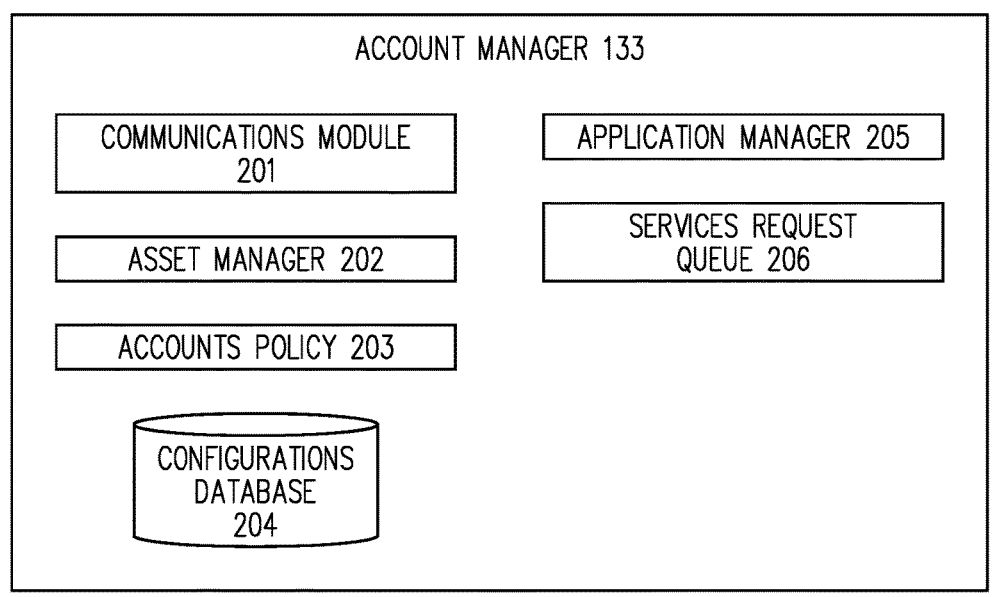
FIG. 2 is a block diagram of an account manager used for managing communications between applications and multiple user computing systems, in accordance with one embodiment.

FIG. 2 illustrates a block diagram 200 of the account manager 133 that is configured to provide an interface between the user computing systems 134-136, 139-140, 151 and the applications 115-118, according to one embodiment. The account manager 133 includes, but is not limited to, a communications module 201, an asset manager 202, and accounts policy 203, a configurations database 204, an application manager 205, and a services request queue 206, according to one embodiment.

The communications module 201 enables the account manager 133 to communicatively couple the user computing systems 134-136, 139-140, 151 to the applications 115-118 hosted on the virtual assets 111-113, according one embodiment. The communications module 201 can include various API for accessing, transmitting commands to, receiving information from, installing applications on, instantiating, decommissioning, and/or otherwise manipulating the virtual assets 111-113, according to one embodiment. The communications module 201 receives application service requests from and delivers application responses to the user computing systems 134-136, 139-140, 151, in one embodiment.

The asset manager 202 enables the account manager 133 to monitor, create, delete and otherwise manage virtual assets in the asset computing environment 110, according to one embodiment. The asset manager 202 communicates with the asset management computing environment 120, through the communications module 201, to instruct the asset management computing environment 120 to create new virtual assets, decommission existing virtual assets, and/or alter resources allocated to the virtual assets, based at least in part on the usage of the virtual assets by the user computing systems 134-136, 139-140, 151, according to one embodiment. For example, if the account manager 133 installs an additional application on the first virtual asset 111, the asset manager 202 may submit a request to the asset management computing environment 120 that the volatile/non-volatile memory resources and/or the processor resources for the first virtual asset 111 be increased. The requested increase in resources for the first virtual asset 111 may correspond with an anticipated increase in traffic to the first virtual asset 111 based at least partially on the installation of the additional application. In one embodiment, the asset manager 202 monitors the number of user computing systems that are serviced by the account manager 133 and creates additional virtual assets in the asset computing environment 110 to accommodate the traffic between the user computing systems and the asset computing environment 110.

The accounts policy 203 determines the permissions rights and the accessibility of the user computing systems 134-136, 139-140, 151 to the virtual assets 111-113 and the applications 115-118, according to one embodiment. The accounts policy 203 can receive, store, and manage rules for granting and denying permissions rights of the user computing systems to the virtual assets 111-113 and the applications 115-118. The accounts policy 203 receives rules from a system administrator, from the tenant, and/or from one or more clients, e.g., the client computing environment 150, according to one embodiment. For example, the accounts policy 203 can have rules that determine interactions between the first group 131, the second group 132, and the third group 157 within the asset computing environment 110. For example, the accounts policy 203 may prohibit the first group 131 and the third group 157 from sharing an application, e.g., that provides services related to personal finance management, and may authorize the second group 132 and the third group 157 to share the application, according one embodiment. In one embodiment and as illustrated in FIG. 1, the accounts policy 203 includes applications permissions that: grants access rights to the first instance of the first application 115 to the first group 131 and the third group 157; grants access rights to the second application 116 to the first group 131 and the second group 132; grants access rights to the third application 117 to the first group the third group 157; and grants access rights to the second instance of the first application 118 to the second group 132 and the third group 157. In one embodiment, the accounts policy 203 populates the permissions database 114 with rules from a system administrator, from the tenant, and/or from one or more clients of the tenant, for granting/denying access to applications by particular user computing systems 134-136, 139-140, 151 and/or particular groups 131, 132, 157. In one embodiment, the accounts policy 203 assigns the user computing systems 134-136, 139-140, 151 to the groups 131, 132, 157 at least partially based on characteristics of the function of the user computing systems 134-136, 139-140, 151 or at least partially based on characteristics of the user accounts, e.g., user accounts 151, 158.

The configurations database 204 includes one or more tables or data structures that provide relationships between the user computing systems 134-136, 139-140, 151, the groups 131, 132, 157, the tenant computing environment 130, the client computing environment 150, the virtual assets 111-113, and the applications 115-118, according to one embodiment. The configurations database 204 includes identifiers for the user computing systems 134-136, 139-140, 151, virtual asset permissions for each user computing system 134-136, 139-140, 151, application permissions for each user computing system 134-136, 139-140, 151, identifiers for the applications 115-118, identifiers for the virtual assets 111-113, and identifiers for application installations with respect to virtual assets. The configurations database 204 may be partially populated from information within the accounts policy 203, according one embodiment. The account manager 133 populates the configurations database 204 each time the asset manager 202 modifies or manipulates one of the virtual assets 111-113 and each time the application manager 205 installs, removes, or otherwise manipulates one of the applications 115-118, according to one embodiment. The configurations database 204 can associate each application 115-118 with each group 131, 132, 157 in accordance with the accounts policy 203, according to one embodiment.

The application manager 205 receives, manages, and delivers requests for applications services, according to one embodiment. The application manager 205 receives requests from the user computing systems 134-136, 139-140, 151 for applications services. The application manager 205 organizes and temporarily stores the received requests in the services request queue 206, according to one embodiment. The application manager 205 holds the application service requests in the services request queue 206 and delivers the requests to the applications 115-118 using any one of a number of queue handling techniques. In one embodiment, the application manager 205 delivers the application service requests to the applications 115-118 according to the order in which the requests are received. In another embodiment, the application manager 205 delivers the application service requests to the applications 115-118 according to the priority of the requests. For example, the requests from the second group 132 can be assigned a higher priority than requests from the first group 131, and the application manager 205 is configured to deliver application service requests originating from the second group 132 prior to requests originating from the first group 131, according to one embodiment. In one embodiment, requests from the user computing systems 151 of the client computing environment 150 receive a higher priority than requests from the user computing systems 134-136, 139-140 of the tenant computing environment 130. The application manager 205 also receives responses from the applications 115-118 and delivers the responses to the user computing systems 134-136, 139-140, 151 according to a predetermined priority or according to the order the responses are received, according to various embodiments.

The application manager 205 monitors and manipulates applications and access permissions to the applications, according to one embodiment. The application manager 205 installs and uninstalls applications in the virtual assets, based on requests from the user computing systems 134-136, 139-140, 151 and/or based on usage of the applications 115-118 by the user computing systems. For example, if the application manager 205 determines that an instance of an application receives traffic that is in excess of a predetermined threshold, the application manager 205 may create an additional instance of the application. If the application manager 205 determines that one or more instances of an application are underutilized, the application manager 205 may uninstall or delete the one or more underutilized instances from the virtual assets. In some embodiments, the application manager 205 removes access permissions from user computing systems that have discontinued using an application's services for a predetermined period of time.

The application manager 205 tracks costs and charges incurred through application use by the user computing systems 134-136, 139-140, 151, according to one embodiment. Charge back or charge tracking enables the tenant computing environment 130 to track and bill charges incurred by one or more client computing environments, e.g., the client computing environment 150. In one embodiment, the application manager 205 tracks or assigns charges to the user computing systems 134-136, 139-140, 151 at least partially based on the number of applications service requests made by the user computing systems 134-136, 139-140, 151. In another embodiment, the application manager 205 tracks or assigns charges to the user computing systems 134-136, 139-140, 151 based on the bandwidth or other computing resources expended/used in responding to the request or used in delivering the request to the applications 115-118. The application manager 205 uses other techniques for tracking and/or assigning charges incurred by user computing systems, according to various other embodiments.

Process

Figure 3:
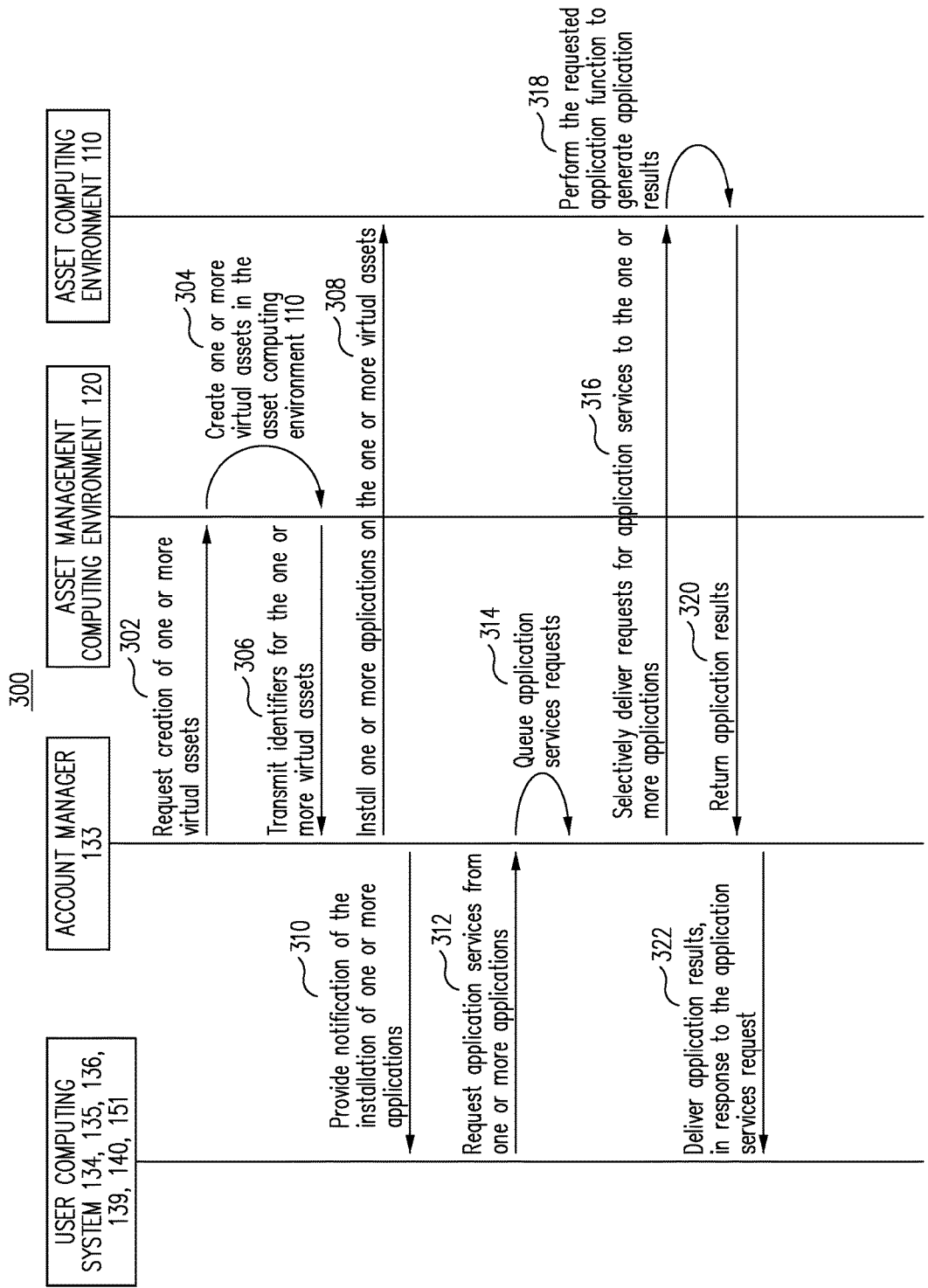
FIG. 3 is a flow diagram for managing communications between applications and multiple user computing systems, in accordance with one embodiment.

FIG. 3 illustrates a functional flow diagram of a process 300 for managing communications between applications and multiple user computing systems and/or for distributing multi-user support for software applications in the production environment 100, according to one embodiment.

At 302, the account manager 133 requests creation of one or more virtual assets, according to one embodiment. The account manager 133 transmits the requests for the creation of one or more virtual assets to the asset management computing environment 120.

At 304, the asset management computing environment 120 creates one or more virtual assets in the asset computing environment 110, to fulfill the request received from the account manager 133, according to one embodiment.

At 306, the asset management computing environment 120 transmits identifiers for the one or more virtual assets to the account manager 133, according to one embodiment. The identifiers can include handles, uniform resource locators ("URLs"), usernames/passwords, or other identifying information associated with each virtual asset.

At 308, the account manager 133 installs one or more applications on the one or more virtual assets, according to one embodiment. The account manager 133 can functionally compartmentalize or group the user computing systems based on the business unit of the user computing systems, job title of the user of the user computing systems, the security privileges or security level associated with the user computing systems, and the like. The account manager can create functional/physical/logical separation between user computing systems or groups of the user computing systems by installing a first instance of an application on one virtual asset and by installing second instance of the same application on another virtual asset, so that different instances of a particular application are running on different virtual assets to provide application services to different user computing systems or groups of user computing systems.

At 310, the account manager 133 provides notification of the installation of one or more applications to the user computing systems, according to one embodiment. The account manager 133 provides notification of the installation of new applications by updating a table, database, or other data structure, such as the configurations database 204, according to one embodiment. The account manager 133 also notifies and/or updates the application manager interface 155 and/or the applications manager 156 to reflect the newly installed applications, according to one embodiment.

At 312, the user computing system 134-136, 139-140, or 151 requests application services from one or more applications, according to one embodiment. The user computing system 134-136, 139-140, or 151 requests application services by submitting a request, along with the related user data, to the account manager 133. According to one embodiment, the user computing system 151 submits application service requests to the application manager interface 155, which then submits the application services request to the account manager 133. According one embodiment, each of the user computing systems 134-136, 139-140, 151 includes a user interface (e.g., user interface 138, 153) to enable a user to graphically select user data for submission or transmission to the application.

At 314, the account manager 133 queues application service requests received from the user computing system 134-136, 139-140, or 151, according to one embodiment. The account manager 133 can arrange or organize the received application service requests by priority, in order of receipt, or using other queue management techniques, according to one embodiment.

At 316, the account manager 133 selectively delivers requests for application services to the one or more applications hosted in the asset computing environment 110, according to one embodiment.

At 318, the asset computing environment 110, e.g., the applications, perform the requested application function to generate application results, according to one embodiment.

At 320, the asset computing environment 110 returns the application results to the account manager 133, according one embodiment.

At 322, the account manager 133 delivers the application results, in response to the application services requests, to the user computing system 134-136, 139-140, or 151, according to one embodiment.

Figure 4:
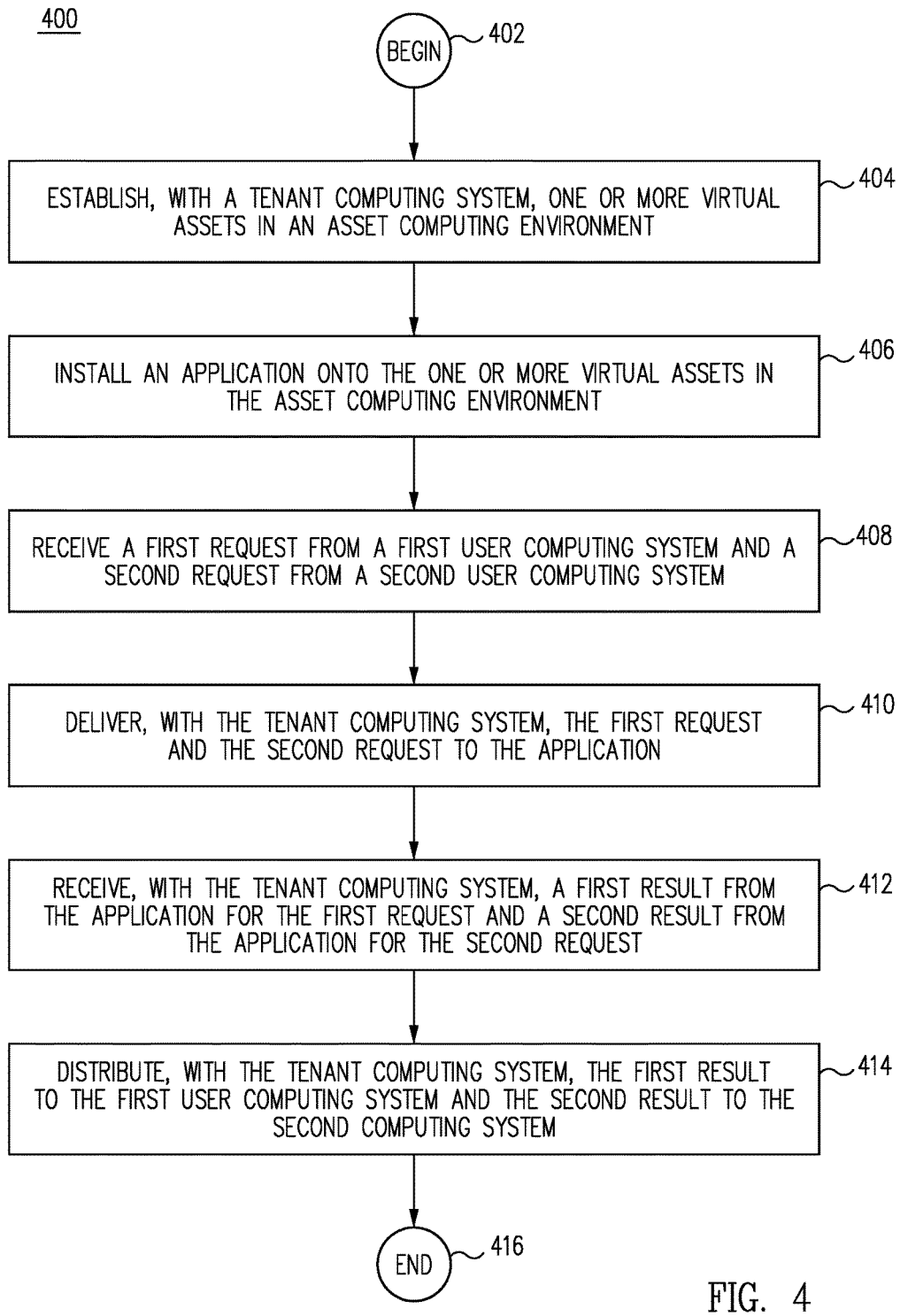
FIG. 4 is a flow diagram for managing communications between applications and multiple user computing systems, in accordance with one embodiment.

FIG. 4 illustrates a flow diagram of a process 400 for distributing multi-user support for software applications through one or more computing environments, according to various embodiments.

At block 402, the process begins.

At block 404, the process establishes, with a tenant computing system, one or more virtual assets in an asset computing environment, according to one embodiment. Each of the one or more virtual assets may be allocated hardware and software assets from the asset computing environment.

At block 406, the process installs an application onto the one or more virtual assets in the asset computing environment, according to one embodiment.

At block 408, the process receives a first request from a first user computing system and a second request from a second user computing system, according to one embodiment. The first request and the second request may be requests for services from the application.

At block 410, the process delivers, with the tenant computing system, the first request and the second request to the application, according to one embodiment. The first request includes first user data and the second request includes second user data.

At block 412, the process receives, with the tenant computing system, a first result from the application for the first request and a second result from the application for the second request, according to one embodiment. The first result may be associated with applying the application to the first user data and the second result may be associated with applying the application to the second user data.

At block 414, the process distributes, with the tenant computing system, the first result to the first user computing system and the second result to the second computing system, according to one embodiment.

At block 416, the process ends.

As noted above, the specific illustrative examples discussed above are but illustrative examples of implementations of embodiments of the method or process for distributing multi-user support for software applications through one or more computing environments. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for managing communications between applications and multiple user computing systems, comprising:
   establishing, with a tenant computing system, one or more virtual assets in an asset computing environment,
      wherein each of the one or more virtual assets is allocated hardware and software resources from the asset computing environment;
   installing an application onto the one or more virtual assets in the asset computing environment, wherein the application supports single-user operations and excludes support for multi-user operations;
   receiving a first request from a first user computing system and a second request from a second user computing system,
      wherein the first request and the second request are requests for services from the application;
   delivering, with the tenant computing system, the first request and the second request to the application,
      wherein the first request includes first user data and the second request includes second user data;
   receiving, with the tenant computing system, a first result from the application for the first request and a second result from the application for the second request,
      wherein the first result is associated with applying the application to the first user data and the second result is associated with applying the application to the second user data; and
   distributing, with the tenant computing system, the first result to the first user computing system and the second result to the second computing system.

2. The method of claim 1, wherein establishing the one or more virtual assets in the asset computing environment includes:
   transmitting, with the tenant computing system, a request to an asset management computing environment to create the one or more virtual assets in the asset computing environment; and
   receiving, with tenant computing system, one or more identifiers from the asset management computing environment for the one or more virtual assets,
      wherein the one or more identifiers enable the tenant computing system to access and manipulate the one or more virtual assets.

3. The method of claim 1, wherein installing an application onto the one or more virtual assets includes:

installing a first instance of the application onto a first virtual asset; and installing a second instance of the application onto a second virtual asset, wherein delivering the first request and the second request include:

delivering the first request to the first instance of the application; and delivering the second request to the second instance of the application so requests from the first and second user computing systems are separately serviced by the first and second virtual assets.

4. The method of claim 1, wherein installing an application onto the one or more virtual assets includes:

installing a first instance of the application onto the one or more virtual assets; and installing a second instance of the application onto the one or more virtual assets so that requests from the first and second user computing systems are separately serviced by the first and second instances of the application.

5. The method of claim 1, wherein the application is one of multiple applications, the method further comprising:

installing the multiple applications onto the one or more virtual assets in the asset computing environment, wherein the tenant computing system includes a permissions policy for the first user computing system and the second computing system, wherein the permissions policy grants authorization to the first user computing system to receive services from a first of the multiple applications and denies authorization to the first user computing system to receive services from a second of the multiple applications, wherein the permissions policy grants authorization to the second user computing system to receive the services of the second of the multiple applications and denies authorization to the second user computing system to receive the services of the first of the multiple applications.

6. The method of claim 1, wherein the first and the second user computing systems are two of multiple user computing systems, wherein the tenant computing system organizes the multiple user computing systems into multiple groups at least partially based on one or more of a business group associated with each user computing system, a job title of a user of each of the user computing systems, and a physical location of each of the user computing systems.

7. The method of claim 1, wherein the tenant computing system maintains a database, wherein the database includes identifiers for the application, the one or more virtual assets, the first and second user computing systems, and access privileges, wherein the access privileges indicate whether the first or second user computing system is authorized to access the application and the one or more virtual assets.

8. The method of claim 1, wherein delivering the first request and the second request to the application includes delivering the first request and the second request in accordance with a priority policy, wherein the priority policy identifies an order in which the first request and the second request are delivered.

9. The method of claim 8, wherein the order is an order in which the first and second requests are received.

10. The method of claim 8, wherein the order is at least partially based on a first priority assigned to the first user computing system and a second priority assigned to the second user computing system by the tenant computing system.

11. The method of claim 1, further comprising receiving, with the tenant computing system, a third request for services from the application from a third user computing system, wherein the first user computing system, the second user computing system, and the tenant computing system are included in a tenant computing environment, wherein the third user computing system is included in a client computing environment, wherein the client computing environment also includes an application manager interface that receives the third request and delivers the third request to the tenant computing system on behalf of the third user computing system.

12. The method of claim 11, further comprising:

receiving, with the tenant computing system, a fourth request from the client computing environment to host a second application for use by the third user computing system; and installing the second application in the one or more virtual assets for use by the third user computing system.

13. The method of claim 11, further comprising:

designating a first of the one or more virtual assets for exclusive use by the third user computing system; and designating a second of the one or more virtual assets for exclusive use by at least one of the first and second user computing systems.

14. The method of claim 11, further comprising monitoring quantities of use of the application by the first user computing system, the second user computing system, and the third user computing system to determine costs associated with usage of the application.

15. A computing system implemented method for distributing multi-user support to a computing system for one or more applications, comprising:

maintaining, with a tenant computing system, one or more virtual assets in an asset computing environment, wherein each of the one or more virtual assets is allocated hardware and software resources from the asset computing environment;

installing the one or more applications onto the one or more virtual assets in the asset computing environment, wherein the one or more applications support only single-user operations and exclude support for multi-user operations;

receiving, with the tenant computing system, application service requests from multiple user computing systems to apply the one or more applications to user data associated with the user computing systems;

queuing the application service requests in an order, wherein the order is at least partially based on a priority of each of the user computing systems or is at least partially based on sequence in which the application service requests were received by the tenant computing system;

transmitting, with the tenant computing system, the application service requests to the one or more applications; and distributing, with the tenant computing system, responses to the application service requests to the one or more user computing systems from the one or more applications.

16. The method of claim 15, wherein the one or more user computing systems include a first group of user computing systems and a second group of user computing systems, wherein the tenant computing system assigns access rights to the one or more virtual assets and to the one or more applications at least partially based on characteristics that are shared by grouped user computing systems.

17. A system for managing communications between applications and multiple user computing systems, the system comprising:
at least one processor; and
at least one memory coupled to the at least one processor, the at least one memory having stored therein instructions which, when executed by the at least one processor, perform a process for managing communications between applications and multiple user computing systems, the process including:
establishing, with a tenant computing system, one or more virtual assets in an asset computing environment,
wherein each of the one or more virtual assets is allocated hardware and software resources from the asset computing environment;
installing an application onto the one or more virtual assets in the asset computing environment, wherein the application supports only single-user operations and excludes support for multi-user operations;
receiving a first request from a first user computing system and a second request from a second user computing system,
wherein the first request and the second request are requests for services from the application;
delivering, with the tenant computing system, the first request and the second request to the application,
wherein the first request includes first user data and the second request includes second user data;
receiving, with the tenant computing system, a first result from the application for the first request and a second result from the application for the second request,
wherein the first result is associated with applying the application to the first user data and the second result is associated with applying the application to the second user data; and
distributing, with the tenant computing system, the first result to the first user computing system and the second result to the second computing system.

18. The system of claim 17, wherein establishing the one or more virtual assets in the asset computing environment includes:
transmitting, with the tenant computing system, a request to an asset management computing environment to create the one or more virtual assets in the asset computing environment; and
receiving, with tenant computing system, one or more identifiers from the asset management computing environment for the one or more virtual assets,
wherein the one or more identifiers enable the tenant computing system to access and manipulate the one or more virtual assets.

19. The system of claim 17, wherein installing an application onto the one or more virtual assets includes:
installing a first instance of the application onto a first virtual asset; and
installing a second instance of the application onto a second virtual asset,
wherein delivering the first request and the second request include:
delivering the first request to the first instance of the application; and
delivering the second request to the second instance of the application so requests from the first and second user computing systems are separately serviced by the first and second virtual assets.

20. The system of claim 17, wherein installing an application onto the one or more virtual assets includes:
installing a first instance of the application onto the one or more virtual assets; and
installing a second instance of the application onto the one or more virtual assets so that requests from the first and second user computing systems are separately serviced by the first and second instances of the application.

21. The system of claim 17, wherein the application is one of multiple applications, the process further comprising:
installing the multiple applications onto the one or more virtual assets in the asset computing environment,
wherein the tenant computing system includes a permissions policy for the first user computing system and the second computing system,
wherein the permissions policy grants authorization to the first user computing system to receive services from a first of the multiple applications and denies authorization to the first user computing system to receive services from a second of the multiple applications,
wherein the permissions policy grants authorization to the second user computing system to receive the services of the second of the multiple applications and denies authorization to the second user computing system to receive the services of the first of the multiple applications.

22. The system of claim 17, wherein the first and the second user computing systems are two of multiple user computing systems,
wherein the tenant computing system organizes the multiple user computing systems into multiple groups at least partially based on one or more of a business group associated with each user computing system, a job title of a user of each of the user computing systems, and a physical location of each of the user computing systems.

23. The system of claim 17, wherein the tenant computing system maintains a database, wherein the database includes identifiers for the application, the first and second virtual assets, the first and second user computing systems, and access privileges,
wherein the access privileges indicate whether the first or second user computing system is authorized to access the application and the one or more virtual assets.

24. The system of claim 17, wherein delivering the first request and the second request to the application includes delivering the first request and the second request in accordance with a priority policy,
wherein the priority policy identifies an order in which the first request and the second request are delivered.

25. The system of claim 24, wherein the order is an order in which the first and second requests are received.

26. The system of claim 24, wherein the order is at least partially based on a first priority assigned to the first user computing system and a second priority assigned to the second user computing system by the tenant computing system.

27. A system for distributing multi-user support to a computing system for one or more applications, comprising:
at least one processor; and at least one memory coupled to the at least one processor, the at least one memory having stored therein instructions which when executed by the at least one processor, perform a process for distributing multi-user support to a computing system for one or more applications, the process including:

maintaining, with a tenant computing system, one or more virtual assets in an asset computing environment,
wherein each of the one or more virtual assets is allocated hardware and software resources from the asset computing environment;

installing the one or more applications onto the one or more virtual assets in the asset computing environment, wherein the one or more applications support only single-user operations and exclude support for multi-user operations;

receiving, with the tenant computing system, application service requests from multiple user computing systems to apply the one or more applications to user data associated with the user computing systems;

queuing the application service requests in an order,
wherein the order is at least partially based on a priority of each of the user computing systems or is at least partially based on sequence in which the application service requests were received by the tenant computing system;

transmitting, with the tenant computing system, the application service requests to the one or more applications; and distributing, with the tenant computing system, responses to the application service requests to the one or more user computing systems from the one or more applications.

28. The system of claim 27, wherein the one or more user computing systems include a first group of user computing systems and a second group of user computing systems, wherein the tenant computing system assigns access rights to the one or more virtual assets and to the one or more applications at least partially based on characteristics that are shared by grouped user computing systems.

* * * * *